(12) United States Patent
Jung et al.

(10) Patent No.: US 8,774,402 B2
(45) Date of Patent: Jul. 8, 2014

(54) ENCRYPTION/DECRYPTION APPARATUS AND METHOD USING AES RIJNDAEL ALGORITHM

(75) Inventors: Chang Ho Jung, Daejeon (KR); Hyeon Jin Kim, Daejeon (KR); Il Hwan Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1088 days.

(21) Appl. No.: 12/465,957

(22) Filed: May 14, 2009

(65) Prior Publication Data

US 2010/0061551 A1 Mar. 11, 2010

(30) Foreign Application Priority Data

Sep. 9, 2008 (KR) ........................ 10-2008-0088552

(51) Int. Cl.
*H04L 9/06* (2006.01)
*G06F 11/30* (2006.01)

(52) U.S. Cl.
USPC ................ 380/44; 380/28; 713/189; 713/190

(58) Field of Classification Search
USPC .................... 380/28, 29, 37, 44; 713/189, 190
See application file for complete search history.

(56) References Cited

U.S. PATENT DOCUMENTS

| | | | | |
|---|---|---|---|---|
| 5,949,884 A * | 9/1999 | Adams et al. | .................... | 380/29 |
| 6,246,768 B1 * | 6/2001 | Kim | ................. | 380/28 |
| 6,937,727 B2 * | 8/2005 | Yup et al. | ......................... | 380/37 |
| 7,158,638 B2 * | 1/2007 | Okada et al. | .................... | 380/37 |
| 7,257,229 B1 * | 8/2007 | Leshem | ........................ | 380/277 |
| 7,295,671 B2 * | 11/2007 | Snell | ................................ | 380/28 |
| 7,386,124 B2 * | 6/2008 | Oofuji et al. | .................... | 380/37 |
| 7,606,365 B2 * | 10/2009 | Noh et al. | ..................... | 380/203 |
| 7,702,100 B2 * | 4/2010 | Han et al. | ......................... | 380/28 |
| 7,809,132 B2 * | 10/2010 | Nadehara | ....................... | 380/28 |
| 8,036,377 B1 * | 10/2011 | Poo et al. | ......................... | 380/28 |
| 2003/0059054 A1 * | 3/2003 | Hu et al. | ....................... | 380/277 |
| 2005/0213756 A1 * | 9/2005 | Hubert | ............................. | 380/44 |
| 2008/0056490 A1 * | 3/2008 | Akishita et al. | ................. | 380/44 |

FOREIGN PATENT DOCUMENTS

| | | |
|---|---|---|
| KR | 1020040108311 A | 12/2004 |
| KR | 1020050053379 A | 6/2005 |
| KR | 1020060014420 A | 2/2006 |
| KR | 10-0668664 B1 | 1/2007 |
| KR | 1020080052291 A | 6/2008 |

OTHER PUBLICATIONS

"An AES crypto chip using a high-speed parallel pipelined architecture", by Yoo et al. 2005.*
"AES and The Cryptonite Crypto Processor", by Oliva et al. 2003.*

(Continued)

*Primary Examiner* — Saleh Najjar
*Assistant Examiner* — Oleg Korsak
(74) *Attorney, Agent, or Firm* — Ladas & Parry LLP

(57) ABSTRACT

An encryption/decryption apparatus and method using an advanced encryption standard (AES) Rijndael algorithm are provided. The apparatus includes a round key operator that performs arithmetic operations on a round key for a first round and first partial round keys of round keys for second to last rounds and generates the round keys for the second to last rounds, and a round executor that performs an encryption or decryption operation using the round key for the first round and the round keys for the second to last rounds.

17 Claims, 6 Drawing Sheets

(56) References Cited

OTHER PUBLICATIONS

"A Highly Regular and Scalable AES Hardware Architecture", by Mangard et al. 2003.*

"High-Speed VLSI Architectures for the AES Algorithm", by Zhang et al. 2004.*

"An FPGA-Based Performance Analysis of the Unrolling, Tiling, and Pipelining of the AES Algorithm", by Saggese et al. 2003.*

Mitsuru Matsui, et al; "How to Maximize Software Performance of Symmetric Primitives on Pentium III and 4 Processors", FSE 2005, LNCS 3557, pp. 398-412, International Association for Cryptologic Research 2005.

T. Chen, et al; "Cell Broadband Engine Architecture and its first implementation—A performance view", IBM J. Res. & Dev. vol. 51, No. 5, Sep. 2007, pp. 559-572.

\* cited by examiner

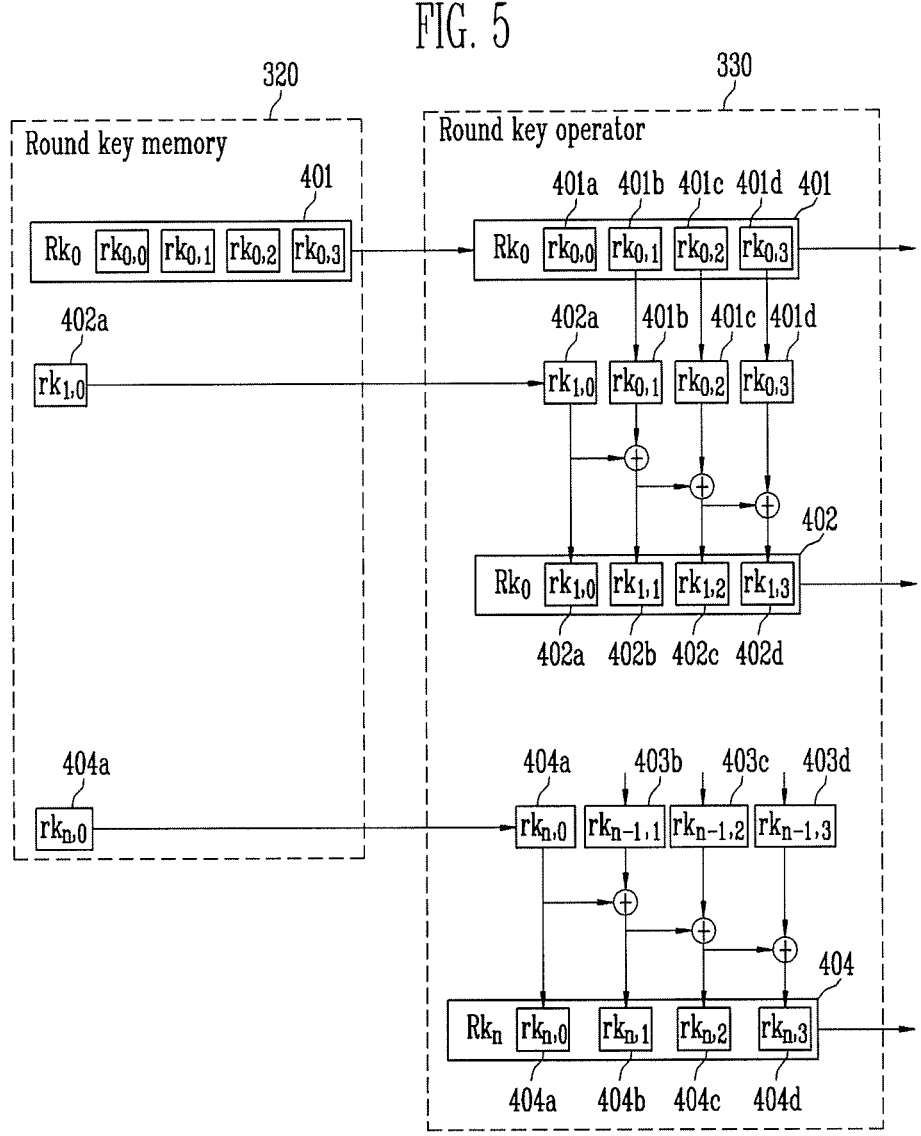

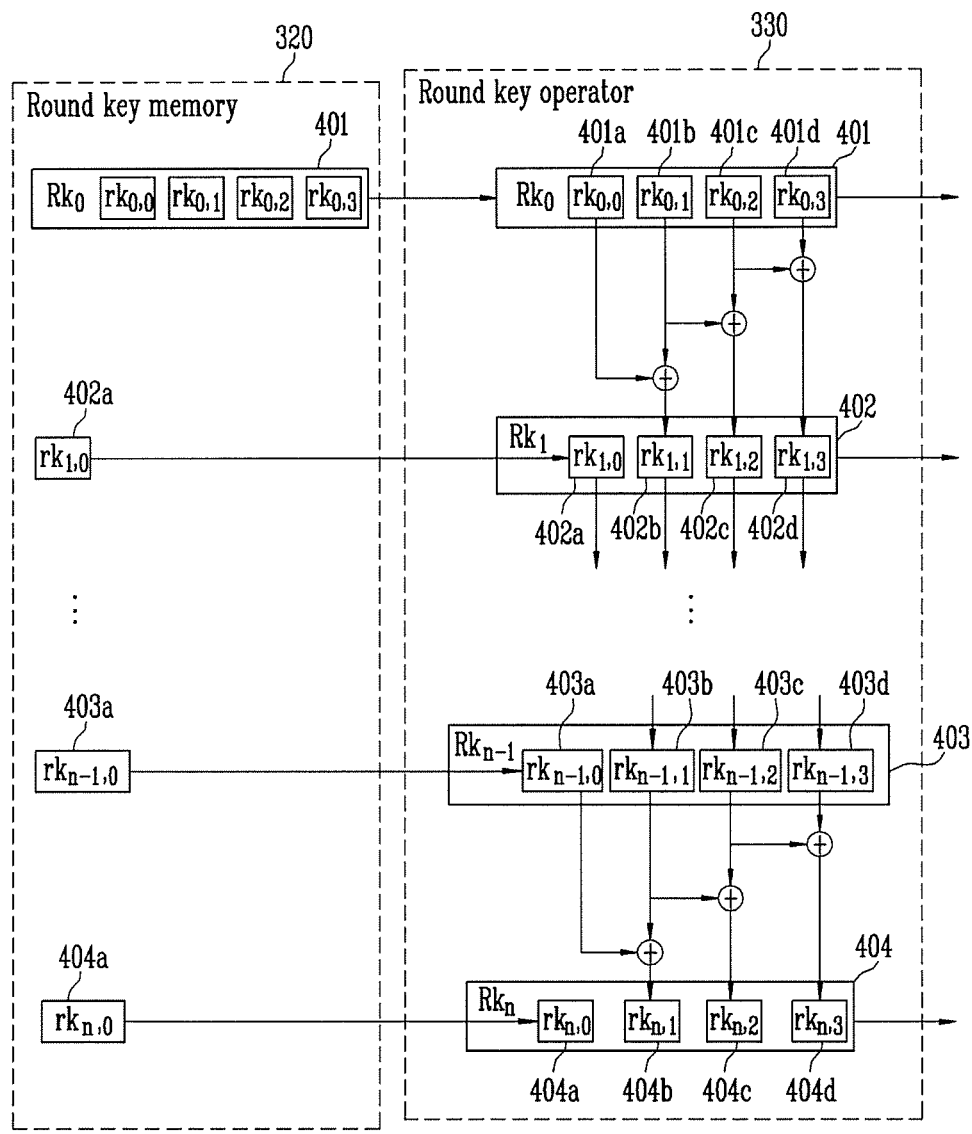

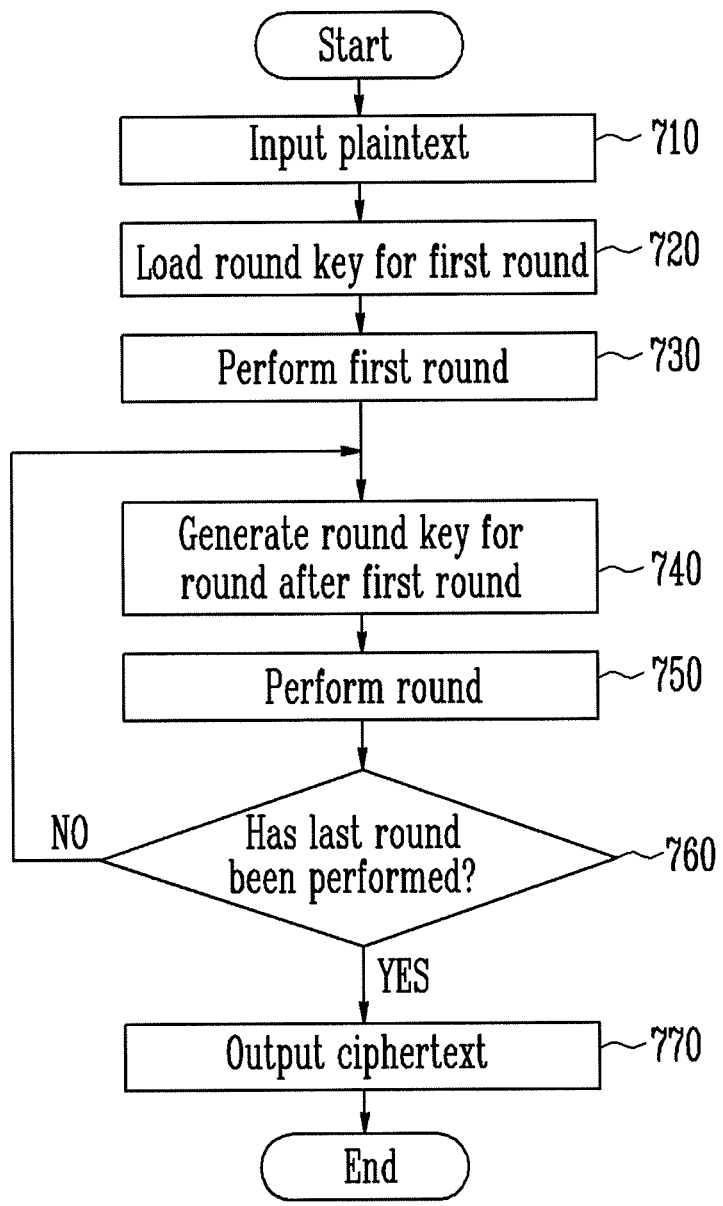

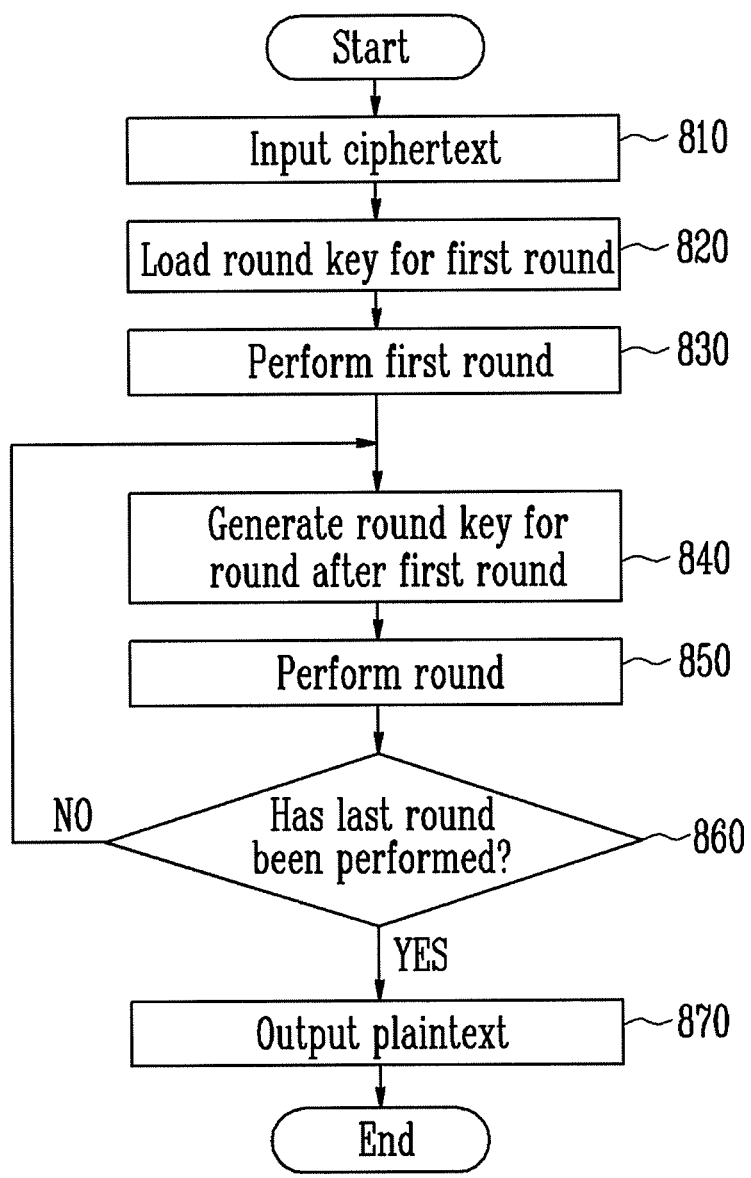

ENCRYPTION/DECRYPTION APPARATUS AND METHOD USING AES RIJNDAEL ALGORITHM

CROSS-REFERENCE TO RELATED APPLICATION

This application claims priority to and the benefit of Korean Patent Application No. 10-2008-0088552, filed Sep. 9, 2008, the disclosure of which is incorporated herein by reference in its entirety.

BACKGROUND

1. Field of the Invention

The present invention relates to an encryption/decryption apparatus using an advanced encryption standard (AES) Rijndael algorithm, and more particularly, to an apparatus and method for improving an encryption/decryption rate using an AES Rijndael algorithm.

2. Discussion of Related Art

Due to the widespread application of electronic payment methods using the Internet and mobile communication networks, the security of private information is very important. The ongoing development of Internet and mobile communication network technology is shadowed by the development of hacking technology for the malicious purpose of stealing private information, etc.

An encryption/decryption process is needed to secure private information, and an AES Rijndael algorithm is used to improve security.

The Rijndael algorithm was designed by Joan Daemen and Vincent Rijmen. Details of its design are described in an AES proposal document submitted to the NIST (National Institute of Standards and Technology). The U.S. government has adopted the Rijndael encryption algorithm as a standard through NIST. The AES algorithm was announced by FIPS (Federal Information Processing Standards) 197 as a NIST published document. The AES Rijndael algorithm is now used worldwide. A large amount of research is aimed at efficiently implementing the AES Rijndael algorithm.

FIG. 1 shows a configuration of a conventional encryption/decryption apparatus using an AES Rijndael algorithm.

Referring to FIG. 1, a conventional encryption/decryption apparatus 100 includes a round key generator 110, a round key memory 120, and a round executor 130.

The round key generator 110 generates round keys for performing first to last rounds using an input key. For example, when the AES algorithm uses a 128-bit round key, the round key generator 110 divides the 128-bit round key into four 32-bit partial round keys.

The round key memory 120 stores the round keys generated in the round key generator 110. For example, the round keys stored in the round key memory 120 may be round keys for first to last rounds including first to fourth partial round keys 201a to 201d, 202a to 202d, - - - , 203a to 203d as indicated by reference numerals 201, 202, - - -, 203 shown in FIG. 2.

The round executor 130 performs the first to last rounds for encrypting plaintext, or decrypting ciphertext, using the round keys stored in the round key memory 120. The round executor 130 includes first to fourth registers and performs a function for loading the 32-bit partial round keys to the first to fourth registers by accessing the round key memory 120 four times.

The round executor 130 performs the first to last rounds using the loaded round keys and outputs generated ciphertext or plaintext.

When the above-described AES Rijndael algorithm performs the first to last rounds using the 128-bit round key, the round executor 130 should load the partial round keys to the first to fourth registers by accessing the round key memory 120 four times per round. To perform the first to last rounds, the round executor 130 should access the round key memory 120 (N+1)*4 times, which makes encryption/decryption time-consuming.

SUMMARY OF THE INVENTION

The present invention provides an encryption/decryption apparatus and method for performing encryption or decryption more quickly using an AES Rijndael algorithm.

According to an aspect of the present invention, there is provided an encryption/decryption apparatus using an AES Rijndael algorithm, including: a round key operator that performs arithmetic operations on a round key for a first round and first partial round keys of round keys for second to last rounds and generates the round keys for the second to last rounds; and a round executor that performs an encryption or decryption operation using the round key for the first round and the round keys for the second to last rounds.

According to another aspect of the present invention, there is provided an encryption method using an AES Rijndael algorithm, including: performing a first round for encrypting plaintext input for encryption using a round key for a first round; generating a round key for an $(N+1)^{th}$ round using second to $K^{th}$ partial round keys of a round key for an $N^{th}$ round and a first partial round key of the round key for the $(N+1)^{th}$ round; performing the $(N+1)^{th}$ round using the round key for the $(N+1)^{th}$ round; and encrypting by performing a last round using a round key for the last round when the round key for the last round is generated while iterating generating the round key and performing the $(N+1)^{th}$ round, and outputting ciphertext generated through the encryption.

According to still another aspect of the present invention, there is provided a decryption method using an AES Rijndael algorithm, including: decrypting ciphertext data input for decryption using a round key for a first round; loading a first partial round key of a round key for an $(N+1)^{th}$ round, computing first to $K^{th}$ partial round keys of a round key for an $N^{th}$ round, and generating the round key for the $(N+1)^{th}$ round; performing the $(N+1)^{th}$ round using the generated round key for the $(N+1)^{th}$ round; and decrypting by performing a last round using a round key for the last round when the round key for the last round is generated while iterating generating the round key and performing the $(N+1)^{th}$ round, and outputting plaintext generated through the decryption.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 5 shows a process for generating encryption round keys according to an exemplary embodiment of the present invention;

FIG. 6 shows a process for generating decryption round keys according to an exemplary embodiment of the present invention;

FIG. 7 is a flowchart showing an encryption process using the AES Rijndael algorithm according to an exemplary embodiment of the present invention; and FIG. 8 is a flowchart showing a decryption process using the AES Rijndael algorithm according to an exemplary embodiment of the present invention.

DETAILED DESCRIPTION OF EXEMPLARY EMBODIMENTS

Figure 1:
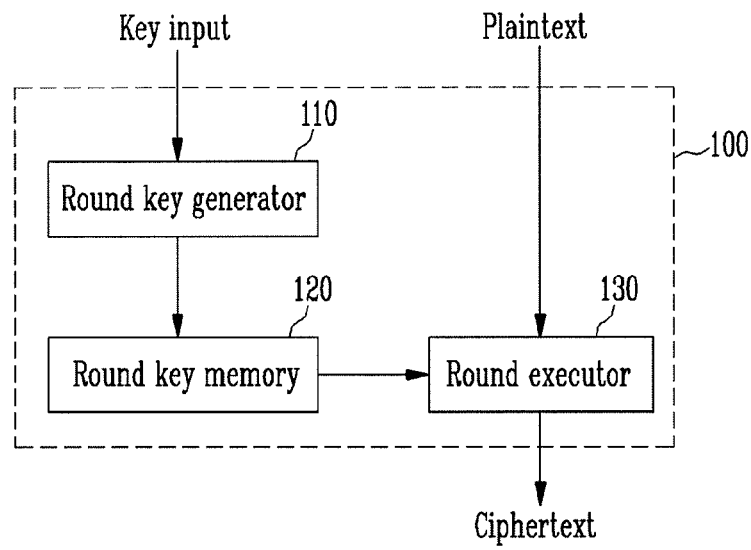
FIG. 1 shows a configuration of a conventional encryption/decryption apparatus using an AES Rijndael algorithm.
Figure 2:
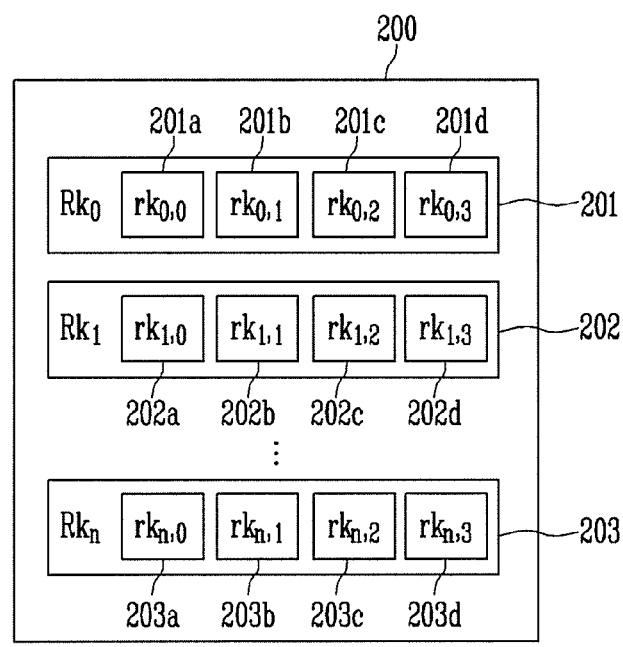
FIG. 2 shows an example of round keys when encryption or decryption is performed using the conventional AES Rijndael algorithm.

Exemplary embodiments of the present invention will be described in detail below with reference to the accompanying drawings. In the drawings, the same or similar elements are denoted by the same reference numerals even when depicted in different drawings. Descriptions of well-known functions and constructions are omitted for clarity and conciseness.

Figure 3:
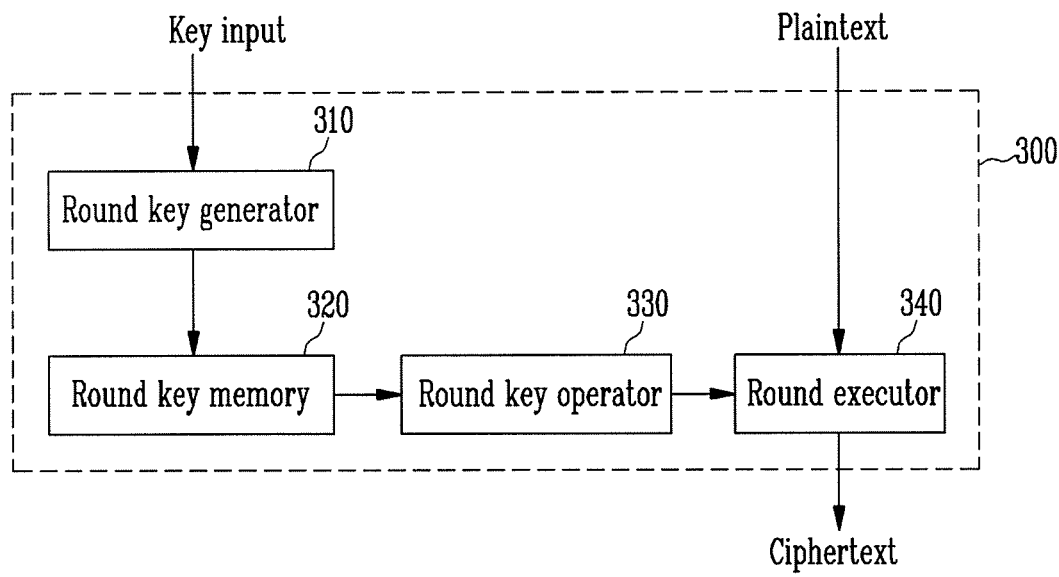
FIG. 3 shows a configuration of an encryption/decryption apparatus using an AES Rijndael algorithm according to an exemplary embodiment of the present invention.

FIG. 3 shows a configuration of an encryption/decryption apparatus using an AES Rijndael algorithm according to an exemplary embodiment of the present invention.

Referring to FIG. 3, the encryption/decryption apparatus includes a round key generator 310, a round key memory 320, a round key operator 330, and a round executor 340.

The round key generator 310 generates round keys for performing first to last rounds using an input key. A round key for one round can be made of first to $K^{th}$ partial round keys. For example, when the AES Rijndael algorithm uses a 128-bit round key, the round key generator 310 divides the 128-bit round key into four 32-bit partial round keys.

In the detailed description of the present invention, it is assumed that the 128-bit round key generated in the round key generator 310 includes first to fourth 32-bit partial round keys.

The round key memory 320 performs a function for storing a round key for a first round and partial round keys for second to last rounds among first to last round keys generated in the round key generator 310. For example, the partial round keys for the second to last rounds include first partial round keys among first to fourth 32-bit partial round keys generated in the round key generator 310.

Encryption or decryption round keys stored in the round key memory 320 will be described in detail with reference to FIG. 3.

The round key operator 330 performs a function for loading and generating round keys for performing encryption or decryption in the first to last rounds. The round key operator 330 can be configured with first to $k^{th}$ registers, for example, first to fourth registers. When the first round is performed, the round key operator 330 performs a function for accessing the round key memory 320 four times, loading first to fourth partial round keys configuring a round key for the first round to the registers and outputting the loaded keys to the round executor 340.

When the second to last rounds are performed, the round key operator 330 loads first partial round keys for the second to last rounds stored in the round key memory 320 and second to fourth partial round keys among previous round keys of a round to be performed, and performs arithmetic operations on the loaded keys, thereby generating round keys for the second to last rounds.

A process in which the round key operator 330 generates the round keys for the second to last rounds will be described in detail with reference to FIGS. 4 and 5.

The round executor 340 performs a function for encrypting plaintext, or decrypting input ciphertext into plaintext, using the round keys for the first to last rounds generated by the round key operator 330 for encryption or decryption, and outputting an encryption or decryption result.

The round keys stored in the round key memory 320 will be described with reference to FIG. 4.

Figure 4:
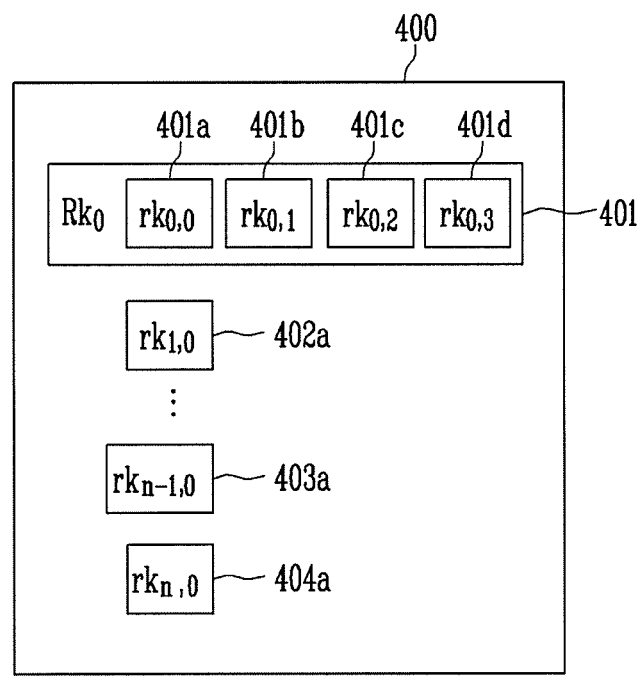
FIG. 4 shows an example of round keys when encryption or decryption is performed in the AES Rijndael algorithm according to an exemplary embodiment of the present invention.

FIG. 4 shows an example of round keys when encryption or decryption is performed using the AES Rijndael algorithm according to an exemplary embodiment of the present invention. For example, a 128-bit round key 401 used in the AES Rijndael algorithm includes first to fourth 32-bit partial round keys 401a, 401b, 401c, and 401d.

Referring to FIG. 4, when the round key generator generates the round keys for the first to last round keys to perform encryption or decryption, the round key memory stores the round key 401 for the first round and partial round keys 402a, - - -, 403a, and 404a for the second to last rounds.

FIG. 5 shows a process in which the round key operator generates round keys for the second to last rounds required to perform encryption using the round keys stored in the round key memory. For example, the round key operator includes first to fourth registers. Partial round keys for the second to last rounds stored in the round key memory are defined as first partial round keys among first to fourth partial round keys.

FIG. 5 shows a process for generating encryption round keys according to an exemplary embodiment of the present invention.

Referring to FIG. 5, the round key operator accesses the first round key 401 stored in the round key memory in units of 32 bits four times, loads the accessed 32-bit keys to the first to fourth registers, and outputs the round key for the first round including partial round keys $rk_{0,0}$ 401a, $rk_{0,1}$ 401b, $rk_{0,2}$ 401c, and $rk_{0,3}$ 401d to the round executor.

The round key operator generates the round keys to perform the second to last rounds.

A process in which the round key operator generates the round keys for the second to last rounds will be described. The round key operator loads a first partial round key $rk_{1,0}$ 402a for the second round stored in the round key memory to the first register and loads the second to fourth partial round keys $rk_{0,1}$ 401b, $rk_{0,2}$ 401c, and $rk_{0,3}$ 401d for the first round.

A second partial round key $rk_{1,1}$ 402b for the second round is generated by performing an arithmetic operation on the first partial round key $rk_{1,0}$ 402a for the second round and the second partial round key $rk_{0,1}$ 401b for the first round.

A third partial round key $rk_{1,2}$ 402c for the second round is generated by performing an arithmetic operation on the second partial round key $rk_{1,1}$ 402b for the second round and the third partial round key $rk_{0,2}$ 401c for the first round.

A fourth partial round key $rk_{1,3}$ 402d for the second round is generated by performing an arithmetic operation on the third partial round key $rk_{1,2}$ 402c for the second round and the fourth partial round key $rk_{0,3}$ 401d for the first round. As described above, the round key operator performs arithmetic operations on the second to fourth partial round keys 401b, 401c, and 401d for the first round and the first partial round key 402a for the second round, thereby generating a round key 402 for the second round.

Thereafter, the round key operator generates round keys corresponding to the number of rounds to be performed by the round executor. The round key operator performs arithmetic operations on second to fourth partial round keys $rk_{n-1,1}$ 403b, $rk_{n-1,2}$ 403c, and $rk_{n-1,3}$ 403d for an $N^{th}$ round and a first partial round key $rk_{n,0}$ 404a for the last round, thereby generating a round key 404 for the last round including $rk_{n,0}$ 404a, $rk_{n,1}$ 404b, $rk_{n,2}$ 404c, and $rk_{n,3}$ 404d.

Through the above-described process, the round key operator generates the round key for the second round based on the second to fourth partial round keys for the first round and the first partial round key for the second round.

Through the above-described process, the round key operator generates necessary round keys when the round executor performs (N+1) rounds and loads only first partial round keys by accessing the round key memory once per round when the second to last rounds are performed, thereby improving an encryption rate.

FIG. 6 shows a process for generating round keys for second to last rounds to perform decryption rounds using a round key for a first round stored in the round key memory and first partial round keys for the second to last rounds.

FIG. 6 shows a process for generating decryption round keys according to an exemplary embodiment of the present invention.

Referring to FIG. 6, when rounds to decrypt input ciphertext are performed, the round key operator accesses the round key memory four times, loads partial round keys $rk_{0,0}$ 401a, $rk_{0,1}$ 401b, $rk_{0,2}$ 401c, and $rk_{0,3}$ 401d to the first to fourth registers, and outputs a loaded round key 401 for the first round to the round executor.

The round key operator generates round keys required to perform the second to last rounds.

A process in which the round key operator generates the round keys for the second to last rounds will be described. The round key operator loads a first partial round key $rk_{1,0}$ 402a for the second round from the round key memory to the first register.

A second partial round key $rk_{1,1}$ 402b for the second round is generated by performing an arithmetic operation on the first partial round key $rk_{0,0}$ 401a for the first round and the second partial round key $rk_{0,1}$ 401b for the first round.

A third partial round key $rk_{1,2}$ 402c for the second round is generated by performing an arithmetic operation on the second partial round key $rk_{0,1}$ 401b for the first round and the third partial round key $rk_{0,2}$ 401c for the first round.

A fourth partial round key $rk_{1,3}$ 402d for the second round is generated by performing an arithmetic operation on the third partial round key $rk_{0,2}$ 401c for the first round and the fourth partial round key $rk_{0,3}$ 401d for the first round.

Thereafter, the round key operator generates round keys corresponding to the number of rounds to be performed by the round executor. To perform the last round, the round key operator generates second to fourth partial round keys $rk_{n,1}$ 404b, $rk_{n,2}$ 404c, and $rk_{n,3}$ 404d for an $(N+1)^{th}$ round by loading a first partial round key $rk_{n,0}$ 404a for the last round stored in the round key memory and computing first to fourth partial round keys $rk_{n-1,0}$ 403a, $rk_{n-1,1}$ 403b, $rk_{n-1,2}$ 403c, and $rk_{n-1,3}$ 403d for an $N^{th}$ round.

When decryption is performed using the AES Rijndael algorithm through the above-described process, the round key operator accesses the round key memory once, loads the first partial round key, and generates the other second to fourth partial round keys, thereby removing a time of loading the three partial round keys from the round key memory.

A process for performing encryption using encryption round keys generated as described above will be described with reference to FIG. 7.

FIG. 7 is a flowchart showing an encryption process using the AES Rijndael algorithm in an encryption apparatus according to an exemplary embodiment of the present invention.

The encryption apparatus using the AES Rijndael algorithm receives input plaintext (710), loads a round key for a first round (720), and performs the first round for encrypting the input plaintext using the loaded round key for the first round (730). Since details of arithmetic processes for first to last rounds performed in the AES Rijndael algorithm are well known, their detailed description is omitted here.

When the first round is performed in step 730, the encryption apparatus loads second to fourth partial round keys for the first round and a first partial round key for the second round, performs arithmetic operations on the loaded keys, and generates a round key for the second round (740).

When the round key for the second round is generated in step 740, the encryption apparatus performs the second round to re-encrypt data encrypted in the first round using the round key for the second round (750).

Upon determining that an encryption operation corresponding to the last round has been performed by iterating steps 740 and 750 for rounds before the last round, encrypting the input plaintext, and generating a round key for the last round (760), the encryption apparatus performs a function for outputting ciphertext encrypted in the first to last rounds (770).

When the second to last rounds are performed, the encryption apparatus loads only first partial round keys from the round key memory and generates round keys corresponding to second to fourth partial round keys, thereby reducing the number of accesses for loading round keys to the round key memory and improving an encryption rate.

A process in which the round executor performs decryption using decryption round keys generated in the round key operator will be described with reference to FIG. 8.

FIG. 8 is a flowchart showing a decryption process using the AES Rijndael algorithm in a decryption apparatus according to an exemplary embodiment of the present invention.

The decryption apparatus using the AES Rijndael algorithm receives input ciphertext (810), loads a round key for a first round (820), and performs the first round for decrypting the input ciphertext using the loaded round key for the first round (830).

Then, the decryption apparatus performs arithmetic operations based on first to fourth partial round keys for the first round, generates second to fourth partial round keys for a second round, loads a first partial round key for the second round from the round key memory, and generates a round key for the second round (840).

Then, the decryption apparatus performs the second round for re-decrypting the ciphertext decrypted in the first round using the generated round key of step 840 (850).

Upon determining that a last round operation for decrypting the ciphertext has been completely performed by iterating steps 840 and 850 for rounds before the last round, decrypting the input ciphertext, and generating a round key for the last round (860), the decryption apparatus performs a function for outputting plaintext generated by performing the last round (870).

When decryption is performed using the AES Rijndael algorithm, the decryption apparatus accesses the round key memory once, loads a first partial round key, and generates second to fourth partial round keys, thereby reducing the number of accesses to the round key memory and improving a decryption rate.

Unlike a conventional method in which all round keys per round should be loaded when encryption or decryption is performed using an AES Rijndael algorithm, the present invention can load only partial round keys in second to last rounds among all rounds, thereby minimizing the number of memory accesses and improving an encryption or decryption rate.

While the present invention has been shown and described in connection with exemplary embodiments thereof, it will be apparent to those skilled in the art that various modifications can be made without departing from the spirit and scope of the invention as defined by the appended claims.

What is claimed is:

1. An encryption/decryption apparatus using an advanced encryption standard (AES) Rijndael algorithm, comprising:
    a computer system comprising a processor and a memory;
    a round key memory that stores (i) a round key for a first round and (ii) a plurality of respective first partial round keys of round keys for second to last rounds, wherein of the round keys for the second to last rounds, only the respective first partial round keys are stored in the round key memory;
    a round key operator, operating on the computer system, that receives from the round key memory the round key for the first round and the respective first partial round keys, and performs arithmetic operations on the round key for the first round and the respective first partial round keys for second to last rounds to generate AES round keys for the second to last rounds, wherein the round key memory stores the plurality of respective first partial round keys prior to the round key operator performing arithmetic operations on the round key for the first round; and
    a round executor operating on the computer system to perform an encryption or decryption operation using the round key for the first round and the AES round keys.

2. The encryption/decryption apparatus of claim 1, further comprising a round key generator that generates the round key for the first round configured with first to $K^{th}$ partial round keys using an input key and the respective round keys for the second to last rounds.

3. The encryption/decryption apparatus of claim 1, wherein the round key operator performs arithmetic operations on second to $K^{th}$ partial round keys of a round key for an $N^{th}$ round and a first partial round key of a round key for an $(N+1)^{th}$ round for encryption and generates second to $K^{th}$ partial round keys of the round key for the $(N+1)^{th}$ round.

4. The encryption/decryption apparatus of claim 3, wherein the round key operator generates the round key for the $(N+1)^{th}$ round using the first partial round key of the round key for the $(N+1)^{th}$ round and the second to $K^{th}$ partial round keys of the round key for the $N^{th}$ round.

5. The encryption/decryption apparatus of claim 1, wherein the round key operator computes first to $K^{th}$ partial round keys of a round key for an $N^{th}$ round for decryption and generates second to $K^{th}$ partial round keys of a round key for an $(N+1)^{th}$ round.

6. The encryption/decryption apparatus of claim 5, wherein the round key operator generates the round key for the $(N+1)^{th}$ round using the second to $K^{th}$ partial round keys of the round key for the $(N+1)^{th}$ round and a first partial round key of the round key for the $(N+1)^{th}$ round loaded from the round key memory.

7. The encryption/decryption apparatus of claim 1, wherein the round key operator generates the round keys for the second to last rounds through exclusive OR (XOR) operations.

8. The encryption/decryption apparatus of claim 1, wherein the round executor performs an arithmetic operation based on a Rijndael encryption or decryption algorithm.

9. An encryption method using an AES Rijndael algorithm, comprising:
    storing in a round key memory a round key for a first round and a plurality of respective first partial round keys of round keys for second to last rounds, wherein of the round keys for the second to last rounds, only the respective first partial round keys are stored in the round key memory, and wherein the round key for the first round and respective first partial round keys of round keys for second to last rounds are received from a round key generator;
    performing a first round for encrypting plaintext input for encryption using the round key for the first round, wherein the round key for the first round and the plurality of respective first partial round keys of round keys for the second to last rounds are all stored prior to the performing the first round of encrypting plaintext;
    generating a round key for an $(N+1)^{th}$ round using second to $K^{th}$ partial round keys of a round key for an $N^{th}$ round and a first partial round key of the round key for the $(N+1)^{th}$ round;
    performing the $(N+1)^{th}$ round using the round key for the $(N+1)^{th}$ round; and
    encrypting by performing a last round using a round key for the last round when the round key for the last round is generated while iterating generating the round key and performing the $(N+1)^{th}$ round, and outputting ciphertext generated through the encryption.

10. The encryption method of claim 9, wherein the generating of the round key comprises performing arithmetic operations on the first partial round key of the round key for the $(N+1)^{th}$ round and the second to $K^{th}$ partial round keys of the round key for the $N^{th}$ round and generating second to $K^{th}$ partial round keys of the round key for the $(N+1)^{th}$ round.

11. The encryption method of claim 10, wherein the generating of the round key comprises generating the round key for the $(N+1)^{th}$ round using the first partial round key of the round key for the $(N+1)^{th}$ round and the second to $K^{th}$ partial round keys of the round key for the $(N+1)^{th}$ round.

12. The encryption method of claim 9, wherein the generating of the round key comprises generating the round key for the $(N+1)^{th}$ round through an XOR operation.

13. The encryption method of claim 9, wherein the encrypting comprises performing an arithmetic operation based on a Rijndael encryption algorithm.

14. A decryption method using an AES Rijndael algorithm, comprising:
    storing in a round key memory a round key for a first round and a plurality of respective first partial round keys of round keys for second to last rounds, wherein of the round keys for the second to last rounds, only the respective first partial round keys are stored in the round key memory;
    decrypting ciphertext data input for decryption using the round key for the first round, wherein the round key for the first round and the plurality of respective first partial round keys of round keys for the second to last rounds are all stored prior to the decrypting ciphertext data input for decryption using the round key for the first round; and decrypting by performing a last round using a round key for the last round, and outputting plaintext generated through the decryption.

15. The decryption method of claim 14, wherein the decrypting comprises performing an arithmetic operation based on a Rijndael decryption algorithm.

16. The encryption/decryption apparatus of claim 1 wherein the respective first partial round keys stored in the round key memory are each a first of four parts of respective AES round keys, and wherein the respective second to fourth partial round keys are not stored with the first partial round key in the round key memory.

17. The decryption method of claim 15 wherein when decryption is performed the round key memory is accessed only once per round.

* * * * *